(12) United States Patent
Millett

(10) Patent No.: US 8,392,426 B2
(45) Date of Patent: Mar. 5, 2013

(54) INDEXING AND FILTERING USING COMPOSITE DATA STORES

(75) Inventor: Ronald P. Millett, Cedar Hills, UT (US)

(73) Assignee: Perfect Search Corporation, Orem, UT (US)

( * ) Notice: Subject to any disclaimer, the term of this patent is extended or adjusted under 35 U.S.C. 154(b) by 0 days.

(21) Appl. No.: 13/052,399

(22) Filed: Mar. 21, 2011

(65) Prior Publication Data

US 2011/0167072 A1 Jul. 7, 2011

Related U.S. Application Data

(63) Continuation of application No. 12/143,441, filed on Jun. 20, 2008, now Pat. No. 7,912,840, which is a continuation-in-part of application No. 11/847,688, filed on Aug. 30, 2007, now Pat. No. 7,774,347.

(51) Int. Cl.
*G06F 7/00* (2006.01)
*G06F 17/30* (2006.01)

(52) U.S. Cl. ......... 707/741; 707/694; 707/736; 707/758

(58) Field of Classification Search ........................ None
See application file for complete search history.

(56) References Cited

U.S. PATENT DOCUMENTS

| | | | |
|---|---|---|---|
| 4,817,036 A | 3/1989 | Millett et al. | |
| 4,961,139 A | 10/1990 | Hong et al. | |
| 5,530,854 A | 6/1996 | Emery et al. | |
| 5,590,716 A | 1/1997 | Mansfield | |
| 5,664,179 A | 9/1997 | Tucker | |
| 5,699,441 A | 12/1997 | Sagawa | |
| 5,701,459 A | 12/1997 | Millett | |
| 5,737,734 A | 4/1998 | Schultz | |
| 5,740,445 A | 4/1998 | Okuda | |
| 5,761,652 A | 6/1998 | Wu | |
| 5,799,312 A | 8/1998 | Rigoutsos | |
| 5,850,565 A | 12/1998 | Wightman | |
| 6,018,733 A | 1/2000 | Kirsch et al. | |
| 6,026,398 A | 2/2000 | Brown | |
| 6,070,164 A | 5/2000 | Vagnozzi | |
| 6,076,051 A | 6/2000 | Messerly et al. | |
| 6,128,613 A | 10/2000 | Wong et al. | |

(Continued)

FOREIGN PATENT DOCUMENTS

| EP | 07757830 | 10/2008 |
|---|---|---|
| WO | WO0210967 | 2/2002 |

(Continued)

OTHER PUBLICATIONS

Office action dated Jul. 28, 2011 cited in U.S. Appl. No. 12/281,262.

(Continued)

*Primary Examiner* — Jau-Shya Meng
(74) *Attorney, Agent, or Firm* — Workman Nydegger

(57) ABSTRACT

Data stores are combined into a composite data store. A method includes referencing a first index entry for a user specified first parameter pattern. The first index entry includes references to record addresses for records in the composite data store which include the first parameter pattern. A first beginning composite data store address of a first selected data store is referenced. A determination is made that the first beginning composite data store address is at or above an address at or above a predetermined threshold above the first record address. Based on determining that the first beginning composite data store address is at or above a predetermined threshold above the first record address, a speed-up data structure is used to eliminate one or more comparisons of record entries in the first index entry between the first record address and the first beginning composite data store address.

20 Claims, 2 Drawing Sheets

U.S. PATENT DOCUMENTS

| | | |
|---|---|---|
| 6,216,123 B1 | 4/2001 | Robertson et al. |
| 6,233,571 B1 | 5/2001 | Egger et al. |
| 6,253,188 B1 | 6/2001 | Witek |
| 6,473,729 B1 | 10/2002 | Gastaldo et al. |
| 6,516,320 B1 | 2/2003 | Odom et al. |
| 6,584,458 B1 | 6/2003 | Millett et al. |
| 6,584,465 B1 | 6/2003 | Zhu |
| 6,658,626 B1 | 12/2003 | Aiken |
| 6,678,686 B1 | 1/2004 | Patel et al. |
| 6,718,325 B1 | 4/2004 | Chandra |
| 6,748,401 B2 | 6/2004 | Blackburn |
| 6,772,141 B1 | 8/2004 | Pratt |
| 6,778,981 B2 | 8/2004 | Lee et al. |
| 6,785,677 B1 | 8/2004 | Fritchman |
| 6,804,664 B1 | 10/2004 | Hartman et al. |
| 6,938,046 B2 | 8/2005 | Cooke et al. |
| 6,947,931 B1 | 9/2005 | Bass et al. |
| 6,985,904 B1 | 1/2006 | Kaluskar et al. |
| 6,993,533 B1 | 1/2006 | Barnes |
| 7,139,753 B2 | 11/2006 | Bass et al. |
| 7,181,438 B1 | 2/2007 | Szabo |
| 7,266,553 B1 | 9/2007 | Anderson et al. |
| 7,296,011 B2 | 11/2007 | Chaudhuri et al. |
| 7,328,211 B2 | 2/2008 | Bordner et al. |
| 7,590,716 B2 | 9/2009 | Sinclair |
| 7,640,363 B2 * | 12/2009 | Teodosiu et al. ....... 707/999.203 |
| 2001/0050682 A1 | 12/2001 | Deering et al. |
| 2002/0099536 A1 | 7/2002 | Bordner et al. |
| 2002/0099685 A1 | 7/2002 | Takano |
| 2002/0103799 A1 | 8/2002 | Bradford et al. |
| 2003/0074341 A1 | 4/2003 | Blackburn et al. |
| 2003/0097356 A1 | 5/2003 | Lee et al. |
| 2003/0191737 A1 | 10/2003 | Steele et al. |
| 2004/0225497 A1 | 11/2004 | Callahan |
| 2004/0225643 A1 | 11/2004 | Alpha et al. |
| 2004/0260694 A1 | 12/2004 | Chaudhuri et al. |
| 2005/0022017 A1 | 1/2005 | Maufer et al. |
| 2005/0108230 A1* | 5/2005 | Carroll .............................. 707/7 |
| 2005/0108394 A1 | 5/2005 | Braun et al. |
| 2005/0114298 A1 | 5/2005 | Fan et al. |
| 2005/0131872 A1 | 6/2005 | Calbucci et al. |
| 2005/0171926 A1 | 8/2005 | Thione |
| 2005/0281469 A1 | 12/2005 | Anderson et al. |
| 2005/0283468 A1 | 12/2005 | Kamvar et al. |
| 2006/0004740 A1 | 1/2006 | Dettinger |
| 2006/0036649 A1 | 2/2006 | Simske et al. |
| 2006/0080361 A1 | 4/2006 | Suzuki |
| 2006/0106793 A1 | 5/2006 | Liang |
| 2006/0126916 A1 | 6/2006 | Kokumai |
| 2006/0195672 A1* | 8/2006 | Inoue et al. ................... 711/170 |
| 2006/0212420 A1 | 9/2006 | Murthy |
| 2006/0235843 A1 | 10/2006 | Musgrove et al. |
| 2006/0265396 A1* | 11/2006 | Raman et al. ................... 707/10 |
| 2007/0027864 A1 | 2/2007 | Collins et al. |
| 2007/0033165 A1 | 2/2007 | Sheinwald et al. |
| 2007/0073894 A1 | 3/2007 | Erickson |
| 2007/0088686 A1 | 4/2007 | Hurst-Hiller |
| 2007/0106876 A1 | 5/2007 | Goswai |
| 2007/0156677 A1 | 7/2007 | Szabo |
| 2007/0162481 A1 | 7/2007 | Millett |
| 2007/0175674 A1 | 8/2007 | Brinson |
| 2007/0203898 A1 | 8/2007 | Carmona |
| 2007/0250494 A1 | 10/2007 | Peoples et al. |
| 2008/0018794 A1 | 1/2008 | Fung |
| 2008/0154938 A1 | 6/2008 | Cheslow |
| 2009/0019038 A1 | 1/2009 | Millett |

FOREIGN PATENT DOCUMENTS

| | | |
|---|---|---|
| WO | WO2007082212 | 7/2007 |
| WO | WO2007103815 | 9/2007 |
| WO | PCTUS2007063218 | 8/2008 |

OTHER PUBLICATIONS

Notice of Allowance dated Nov. 25, 2011 cited in U.S. Appl. No. 12/281,262.
Office action dated Dec. 6, 2011 cited in U.S. Appl. No. 11/847,784.
U.S. Appl. No. 11/328,863, filed Jan. 10, 2006, Millett.
U.S. Appl. No. 60/779,214, filed Mar. 3, 2006, Millett.
U.S. Appl. No. 11/681,673, filed Mar. 2, 2007, Millett.
U.S. Appl. No. 11/847,784, filed Aug. 30, 2007, Millett.
U.S. Appl. No. 11/847,869, filed Aug. 30, 2007, Millett.
U.S. Appl. No. 12/143,432, filed Jun. 20, 2008, Millett.
U.S. Appl. No. 12/281,262, filed Aug. 29, 2008, Millett.
U.S. Appl. No. 12/211,713, filed Sep. 16, 2008, Millett.
Ceglowski, Maciej "Using Bloom Filters", Apr. 8, 2004, http://www.perl.com/pub/a/2004/04/08/bloom_filters.html, 4 pages.
Manning, Christopher D. and Schutze, Hinrich Foundations of Statistical Natural Language Processing, The MIT Press, Cambridge Massachusetts, May 1999 (pp. 151, 158, 192-194, 377 and 532).
Mitra, Mandar et al. "An Analysis of Statistical and Syntactic Phrases", Jun. 1997.
Possas, Bruno et al. "Set-Based Vector Model: An Efficient Approach for Correlation-Based Ranking", Oct. 2005.
Roblee, Chris, "Hierarchical Bloom Filters: Accelerating Flow Queries and Analysis," Lawrence Livermore National Laboratory FloCon 2008, dated Jan. 8, 2008.
U.S. Appl. No. 11/328,863, Feb. 20, 2008, Office Action.
U.S. Appl. No. 11/681,673, Dec. 29, 2008, Office Action.
U.S. Appl. No. 11/681,673, Oct. 5, 2009, Notice of Allowance.
U.S. Appl. No. 11/847,688, Nov. 27, 2009, Office Action.
U.S. Appl. No. 11/847,688, Apr. 1, 2010, Notice of Allowance.
U.S. Appl. No. 11/847,784, Mar. 4, 2010, Office Action.
U.S. Appl. No. 11/847,784, Aug. 19, 2010, Office Action.
U.S. Appl. No. 11/847,869, Jan. 8, 2010, Office Action.
U.S. Appl. No. 11/847,869, May 13, 2010, Notice of Allowance.
U.S. Appl. No. 12/143,441, May 12, 2010, Office Action.
U.S. Appl. No. 12/143,441, Dec. 14, 2010, Notice of Allowance.
U.S. Appl. No. 12/143,432, Feb. 17, 2011, Office Action.
U.S. Appl. No. 12/211,713, Jan. 12, 2011, Office Action.
U.S. Appl. No. 12/211,713 Apr. 8, 2011, Office Action.
Gaede, V. et al."Multidimensional Access Methods," ACM Computing Surveys, ACM, New York, NY, US, vol. 30, No. 2, Jun. 1, 1998, pp. 170-231.
Xu, Yu, J. et al., "Multi-Cube Computation," Database Systems for Advanced Applications 2001 Proceedings, Seventh International Conference on Apr. 18-21, 2001, Piscataway, N.J., USA, pp. 126-133.
Shukla, A. et al., "Storage Estimation for Multidimensional Aggregates in the Presence of Hierarchies," Proceedings of the 22th International Conference on Very Large Data Bases, San Francisco, CA, USA, 1996.
Wikipedia, "Hash Function, from Wikipedia," Internet Citation, Retrieved on Apr. 18, 2008 from http://en.wikipedia.org/wiki/hash_function.
Office Action dated Jun. 25, 2009 cited in U.S. Appl. No. 11/681,673.

* cited by examiner

INDEXING AND FILTERING USING COMPOSITE DATA STORES

CROSS-REFERENCE TO RELATED APPLICATIONS

This application is a Continuation of U.S. patent application Ser. No. 12/143,441 titled Indexing and Filtering Using Composite Data Stores, filed on Jun. 20, 2008, now U.S. Pat. No. 7,912,840 issued on Mar. 22, 2011 which is a Continuation In Part of U.S. patent application Ser. No. 11/847,688 titled Vortex Searching, filed on Aug. 30, 2007, now U.S. Pat. No. 7,774,347 issued on Aug. 10, 2010, each of which are incorporated herein by reference in their entireties.

BACKGROUND

Background and Relevant Art

In computing systems, there is often a need to search for data. Such searches may be performed over data in an individual system, or searches of distributed systems. For example, a user may wish to search for data in a small handheld computer system, or a user may wish to search for data stored on a remote system connected to the Internet.

Traditional search engines use indexes to search for information in records in a data space. The indexes are arranged as alphabetically ordered word indexes indicating where a particular word, phrase or other search term may be found. Boolean searching is able to be performed using traditional indexes in traditional search engines by identifying records in the data space that include the Boolean arguments, i.e. search terms, and then applying a specified Boolean operator to the records. For example, consider the case where a user wishes to find a record which includes all of the terms "quick," "red," and "fox." Using a traditional search engine, to find the records with all three of these terms, first the index is used to identify all records including the term "quick." Then, the index is used to find all records including the term "red." The index is also used to find all of the records including the term "fox." A comparison of the records is then made using a Boolean AND operation that is performed on the records identified for "quick," the records identified for "red," and the records identified for "fox." The result of the AND operation is the desired records. Because of this ANDing process, traditional search engines require large amounts of processing power when one or more of the entries in an index is dense.

Additionally traditional search engines may be able to search a number of repositories of data where the repositories are combined as a single composite repository. If a user wishes results to be filtered based on user selection of individual repositories storing the data, then additional ANDing type filtering is used. In particular, all results may be found in the composite repository and these results would be ANDed with an indicator of a user selected repositories.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments described herein may include method acts that may be performed in a computing environment that includes a number of data stores. The data stores may be combined into a composite data store. The composite data store stores the data stores sequentially such that each data store in the composite data store is in a range including a beginning composite data store address and an ending composite data store address. A method includes acts for finding records in one or more of the data stores based on user specified search parameter patterns and based on selected data stores. The method includes referencing a first index entry for a user specified first parameter pattern. The first index entry includes references to record addresses for records in the composite data store which include the first parameter pattern. Referencing a first index entry further includes referencing a first record address in the first index entry. A first beginning composite data store address of a first selected data store is referenced. A determination is made that the first beginning composite data store address is at or above an address at or above a predetermined threshold above the first record address. Based on determining that the first beginning composite data store address is at or above a predetermined threshold above the first record address, a speed-up data structure is used to eliminate one or more comparisons of record entries in the first index entry between the first record address and the first beginning composite data store address.

Elimination of one or more comparisons may be performed by jumping over irrelevant references. Once the jump has been performed, comparisons can be performed to relevant addresses in one or more index entries. Further, a determination can be made when comparing results in exceeding reaching or exceeding an ending composite data store address for a selected data store. A determination can then be made whether or not to use a speed-up data structure to jump to a next selected data store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Some embodiments described herein are directed to allowing for efficient filtering of data stores when a composite data store is used to combine a number of individual data stores. In particular, it may be desirable to filter search results based on the data stores. For example, a user may wish to search for a given term, but may only wish to search for the term in certain data stores.

Figures 1, 2:
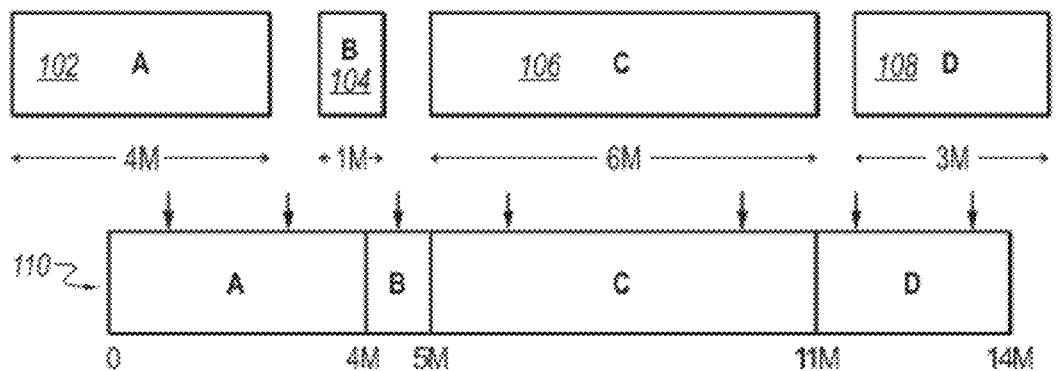
FIG. 1 illustrates a number of indexes and a corresponding composite index.
FIG. 2 illustrates an offset correlation table.

Referring now to FIG. 1, an example is illustrated. FIG. 1 illustrates four individual data stores, A 102, B 104, C 106, and D 108. These data stores may be combined into a composite data store 110. In the example illustrated in FIG. 1, data store A 102 comprises 4 million records numbered from 0 to 3,999,999. Data store B 104 comprises 1 million records numbered from 0 to 999,999. Data store C 106 comprises 6 million records numbered from 0 to 5,999,999. Data store D 108 comprises 3 million records numbered from 0 to 2,999,999. The composite data store 110 is a composite of the data stores 102, 104, 106 and 108. The composite data store includes 14 million records numbered from 0 to 13,999,999 million. Records 0 to 3,999,999 are the records included in data store A 102. Records 4,000,000 to 4,999,999 are there records included in data store B 104. Records 5,000,000 to 10,999,999 are there records included in data store C 106. Records 11,000,000 to 13,999,999 million are there records included in data store D 108.

Notably, some embodiments may implement a composite data store on a small mobile device such as a handheld PDA or smart-phone. In particular, composite data stores may be particularly suited for use in devices which have limited storage memory. In these devices, as well as in other devices, a composite data store may store one or more of an email data store, a contacts data store, a calendar data store or a tasks data store. Other data stores may be also are alternatively be used such as e-books, databases, web pages, etc.

Now illustrating one example, a user may desire to search the portions of the composite data store 110 which include data stores B 104 and D 108 for one or more parameter patterns, while not searching the portions of the composite data store 110 including data stores A 102 and C 106. Traditionally, to accomplish this a search would be performed on the entire composite data store 110 using an index that indexes the parameter patterns for the entire composite data store 110 and filtering would be applied after all of the results had been obtained. However, some embodiments of the present invention provide for improved performance by reducing the amount of searching that is performed when filters are applied. To accomplish this functionality, a speedup data structure may be used to eliminate large portions of the composite data store 110 from being searched if it is known beforehand that those portions will be filtered at the conclusion of the search. Examples of this when intersecting different parameter patterns is illustrated in U.S. patent application Ser. No. 11/847,688 titled "Vortex Searching," filed on Aug. 30, 2007, which is incorporated herein be reference in its entirety. Examples when intersecting parameter pattern index entries with index boundaries are illustrated below.

Note that when reference is made to searching a data store herein, searching of the data store may be performed by searching an index, without any actual comparison in the records of the data store. Eliminating the amount of searching can be accomplished in a number of different ways.

Parameter patterns include one or more elements, which may be specified for a particular search. For example, a parameter pattern may be a word, phrase, number, date, etc. Parameter patterns may also include patterns for other types of patterns such as image patterns, sound patterns, fingerprint patterns, voice patterns, etc. Other patterns may also be used within the scope of parameter patterns.

In some embodiments described herein searching is made more efficient by reducing the number of records on which Boolean intersection techniques are applied. This may be accomplished by eliminating records from searching For example, consider the following index entry:

red . . . 3,102,654, 4,500,126, 600,023, 9,212,818, 11,212, 119, 13,526,408

These entries are illustrated in FIG. 1 on the composite data store 110 as arrows pointing to the record where the parameter pattern "red" can be found in the data store 110. In the present example, it is desirable only to search in data stores B 104 and D 108, or in records from 4,000 to 4,999,999 and from 11,000,000 to 13,999,999. Thus, embodiments may be implemented where comparisons at 3,102,654, 600,023, and 9,212,818 may be eliminated from searching by using a speed-up data structure such as one of the data structures described below. Notably, in the present example, it is actually probably more efficient to simply perform the comparisons, because of the low density of records including the parameter pattern "red", the computational costs for using a speed-up data structure, and the extra comparisons that are performed using a speed-up data structure. However, a higher density preliminary example may be overly complicated for purposes of understanding the principles being illustrated.

Illustrating now one example, an index entry may be checked. For example, a search algorithm may be performing comparisons based on the index entry for record 3,102,654. A determination is made whether or not the index entry is within the limits of one of the selected data stores. As noted above, the limits for data store B are a beginning data store address of 4,000,000 and an ending data store address of 4,999,99 million, while the limits for data store D are a beginning data store address of 11,000,000 and an ending data store address of 13,999,999. The entry for record 3,102,654 is not in the limits for either of these data stores, so a determination can then be made whether or not to use a speed-up algorithm to eliminate records from searching. The determination to use a speed-up data structure may involve a calculation of a number of records between a current record entry (i.e. 3,102,654) and the lower limit of a selected data store (i.e. 4,000,000 for data store B). A large number of records between a current record entry and a lower limit of a selected data store may indicate that a large number of comparisons can be avoided. Thus, the use of a speed-up data structure may be justified. In one embodiment, a predetermined difference between a current record entry and a lower limit of a selected data store may be used to indicate when a speed-up data structure may be used.

Jumps eliminating comparisons may be accomplished by using a speed-up data structure that allows for skipping of a number of record comparisons may be implemented. One speedup structure is a multi-level bit reducing structure. An example of this structure is now illustrated. Assume that an example index for a composite data store is as follows:

quick . . . 0.1, 3, 7, 9, 11, 13, 15, 17, 19, 21, 23, 25, 27, 29, 31, 33, 35, 37

Further, assume that there are three data stores in a composite data store. The first data store includes record 1. The second data includes records 2 to 34. The third data store run includes records 35 to 37. A speedup data structure for the index entry "quick" may be implemented. The speedup data structure is a level bit shifting data structure implemented as follows:
References: 1, 3, 5, 7, 9, 11, 13, 15, 17, 19, 21, 23, 25, 27, 29, 31, 33, 35, 37
Level 1: 1, 9, 17, 25, 33[END]
Level 2: 1, 33[END]
The levels include levels 1 and 2, in this embodiment, and contain pointers to references in the base index entry based on a particular logical interval. For example, notice that Level 1 is based on an interval of 8. As will be shown later, this allows the bit shifting to include a two bit shift that is performed to switch comparing from the reference list to Level 1. Similarly, Level 2 has an interval of 32, which allows for another two bit shift to shift comparison from Level 1 to Level 2. Notably, specifying an interval which allows for a level shift using 5 bits has proven to be more effective in obtaining speedups, as shifting from level to level can be expensive in terms of processing power. However, the 2 bit shift shown here is easier to illustrate and as such is used for example purposes.

Assume that a user is interested in searching the first and third data stores. Illustrating now the functionality of the speedup data structure, to find an intersection between "quick" and the first and third data store records, the following comparisons are performed where the number in the parenthesis indicates the record number for either a parameter pattern or a data store as appropriate: FirstDataStore (1) AND quick (1), quick (3) AND ThirdDataStore (35), quick (5) AND ThirdDataStore (35), and quick (7) AND ThirdDataStore (35) in the composite data store reference list. 9 is a boundary between the data store reference list and Level 1, as such, a shift may be made to Level 1 for further comparisons. The decision to shift to Level 1 may be made using any one of a number of different criteria. In one embodiment, the decision is made based on the magnitude of the difference between the record numbers being compared at the boundary. In this example, the magnitude is the difference between 35 and 9. In other embodiments, the shift may be made to a next level simply based on having reached a boundary. At Level 1, the comparisons quick (17) AND ThirdDataStore (35) and quick (25) AND ThirdDataStore (35). 33 is a boundary, so comparisons may be switched to Level 2. At level 2, the comparison is quick (33) AND ThirdDataStore (35) and the end of the list designator is encountered [END]. Moving comparisons back to Level 1, the end of the list designator is encountered, so comparisons are once again switched to the composite data store reference list. The comparisons are quick (33) AND ThirdDataStore (35) and quick (35) AND ThirdDataStore (35) in the reference list, where an intersection is found. Thus, in this example, comparisons were eliminated for "quick" at 11, 13, 15, 19, 21, 23, 27, 29, and 31.

A determination can then be made that the intersection does not exceed the range for the third data store. Thus a comparison is made to ensure that the intersection record, i.e. 35, does not exceed the third data store boundary, i.e. 37. In this case, the intersection record does not exceed the third data store boundary, and thus the intersection at 35 is determined to be a valid result within the data stores for which records are sought.

In another embodiment, an offset correlation table may be used when a very large number of references are included in an index entry. Assume for example that the index entry for "quick" includes a list of records including all odd numbered records from 1 to 13,999,999 in a composite data store. The composite data store includes the four data stores illustrated in FIG. 1, namely data store A from record 1 to 3,999,999, data store B from record 4,000,000 to 4,999,999, data store C from record 5,000,000 to 10,999,999 and data store D from record 11 million to 13,999,999. The index includes an entry with a list of records that includes every odd numbered record from 1 to 9,999 as follows:
quick . . . 0.1, 3, 7, . . . 9,995, 9,997, 9,999
While the speedup structure described above could provide some efficiencies by eliminating comparisons, even greater efficiencies could be realized by eliminating even more comparisons using an offset correlation table speedup data structure.

Referring now to FIG. 2, an offset-correlation table 200 for the index entry for "quick" is illustrated. The offset correlation table 200 includes two columns, namely an offset column 202 and a records column 204. The offset column 202 includes the top 18 binary bits of a 24 bit number. Notably, in other examples more or fewer bits may be used for binary numbers of more or fewer bits. Selection of the number of offset bits is a design consideration that may balance, for example, the number of records jumped over versus computing costs.

For example the size of the speedup table is often selected be an order of magnitude lower than the reference list size. If there are few references, then no speedup structure is needed. If there are 10,000,000 references in 15,000,000 compressed bytes, a target may be to compress blocks of 16 entries each. In some embodiments, this may be the biggest size for the speedup structure when and because a compressed block is always entered at the beginning of the block. If the average size for the speedup structure is, for example, 30 bytes, and there is a 4 byte offset correlation table entry to hop to it, then about 8:1 is the maximum size for an offset correlation table 200 for this reference list. The offset correlation table 200 can become smaller than that, especially when the reference list might be on flash drive or disk and there might be room for an offset correlation table 200 or other speedup structure in memory. In this case there might be a much higher ratio between offset correlation table size and the reference list. In some embodiments, it may be 256:1 or some similar ratio and still be a great help in making small disk reads in the file to get the right portions of the list rather than reading and processing the whole list from disk. Memory based systems will typically have a smaller ratio of offset correlation table to reference list size and disk based systems will have a larger ratio.

Additionally note that other embodiments may be mapped to other numbering systems or indexing systems. In other words, embodiments are not limited only to the binary example illustrated here.

The records column 204 includes index entries for records corresponding to a given offset. Specifically, in this example, each of the record entries, when represented in binary, has a top 18 bits that are equal to the offset. Illustrating further the relationship between the offsets in the offset column 202 and the records in the records column 204, each offset in the offset table 202 is the top 18 bits of a 24 bit number representing the records in the corresponding records entry in the records column 204. For example, the binary representation of the number 67 is 000000000000000001000011. The top 18 bits of this number are 000000000000000001, which is the off-set for record number 67. Similarly, the binary representation of 13,999,937 is 110101011001111101000001, of which the 18 ten bits are 110101011001111101, which is the off-set that corresponds to 13,999,937 in the offset-correlation table 200.

An example is now illustrated which assumes that a user is interested having returned results only for records in data stores B and D. Illustrating now an example, from the index above, a comparison has been made at record 1 for "quick".

Examination of a lower boundary for data store B illustrates that the next comparison should be at 4,000,000. Rather than comparisons taking place for all of the record entries from 1 to 4,000,000 for the parameter pattern "quick," the offset correlation table can be used to jump past a large number of the records for "quick" to reduce the number of comparisons. In particular, the offset correlation table 200 can be referenced by referencing the first 18 binary bits representing 4,000,000. This is the entry 001111010000100100 illustrated at 206 in FIG. 2. In this example, comparisons are made to the offset as opposed to the individual records for each offset, such that each offset comparison can result in the elimination of 63 comparisons. Comparisons for individual records can then be made beginning at record 4,000,000, where all of the matches for records in data store B are found.

Embodiments may also include functionality for checking a data store upper boundary. For example, as comparisons are being performed beginning at record 4,000,000, a determination should be made whether or not record 4,999,999 has been reached, which is the upper boundary for data store B. Once the upper boundary has been reached or passed, a decision may be made whether or not another offset correlation table jump (or other speed-up data structure jump) may be used to eliminate records from searching.

In the present example, once record 4,999,999 has been reached or passed, it can be determined that the next record of interest will occur no sooner than record 11,000,000, which is the lower boundary of data store D 108. Thus, it will likely be determined that this is a sufficient difference between the present record (i.e. 4,999,999) and a lower data store boundary (i.e. 11,000,000) that an offset correlation table jump should be performed. Thus comparisons will be made in the offset column 202 until the offset for 11,000,000 is reached, which is 101001111101100011, at which point comparisons are once again performed on individual records. It should be noted that comparisons should also be made to determine that the upper boundary for data store D (i.e. 13,999,999) has not been reached or passed as comparisons for individual records are made.

Notably, as with other speedup data structures, the decision to use the offset correlation table may be automatic or based on some factor such as the magnitude of the difference between comparisons, the percentage of the overall index that can be skipped, or other calculated factors.

As noted, some systems may include the ability to select whether or not to use the speedup data structures. In one embodiment, the decision to use a speedup data structure and what speedup data structure to use may be dependent on the size of the index. If the index is sufficiently small, no speedup data structure is used. If the index is of a moderate size, the binary bit shift speedup index may be used. If the index is large, the offset correlation table may be used. In this example, the type of speedup data structure used is selected based on an effort to balance the amount of speedup obtained against the cost of using a speedup data structure. In particular, the binary bit shift structure has some overhead processing that is required to use the structure. Similarly, the offset correlation table is expensive to use in terms of processing power. Thus, it may be more efficient to forgo use of the speedup data structure or to use a less efficient speedup data structure in some cases.

In one embodiment, speedup mechanisms are implemented as follows: for index records having less than 128 references to data store records, no speedup structure is used. For index records having 128 to 1024 references to data store records, a simple two, or more, level index structure may be implemented. Beyond 1024 reference in an index entry, an offset correlation table may be used.

Embodiments may also include various features directed to returning an indication of the number of results of a search. For example, often when results are displayed to a user, the displayed results will be displayed along with information indicating a count of the number of results. Such display may display the total number of results found and/or the number of results displayed. The total number of results indicated may be determined by an actual count, or by estimation. Illustratively, if a search algorithm has counted or discovered a total of 10,000 results and is displaying the first 25 of those, the 25 results will often be displayed with an indicator indicating "1-25 of 10,000." Using the methods described above, Searching can be limited to the results that are actually returned. For example, if data store B 104 is being searched, and only the first 25 results are being displayed, a counter can be used to determine when the first 25 records have been found, at which point searching the data store B 104 can be suspended. When user input is received indicating a desire to view the next 25 records, additional counting can be performed and searching can be resumed to obtain the next 25 records.

Figure 3:
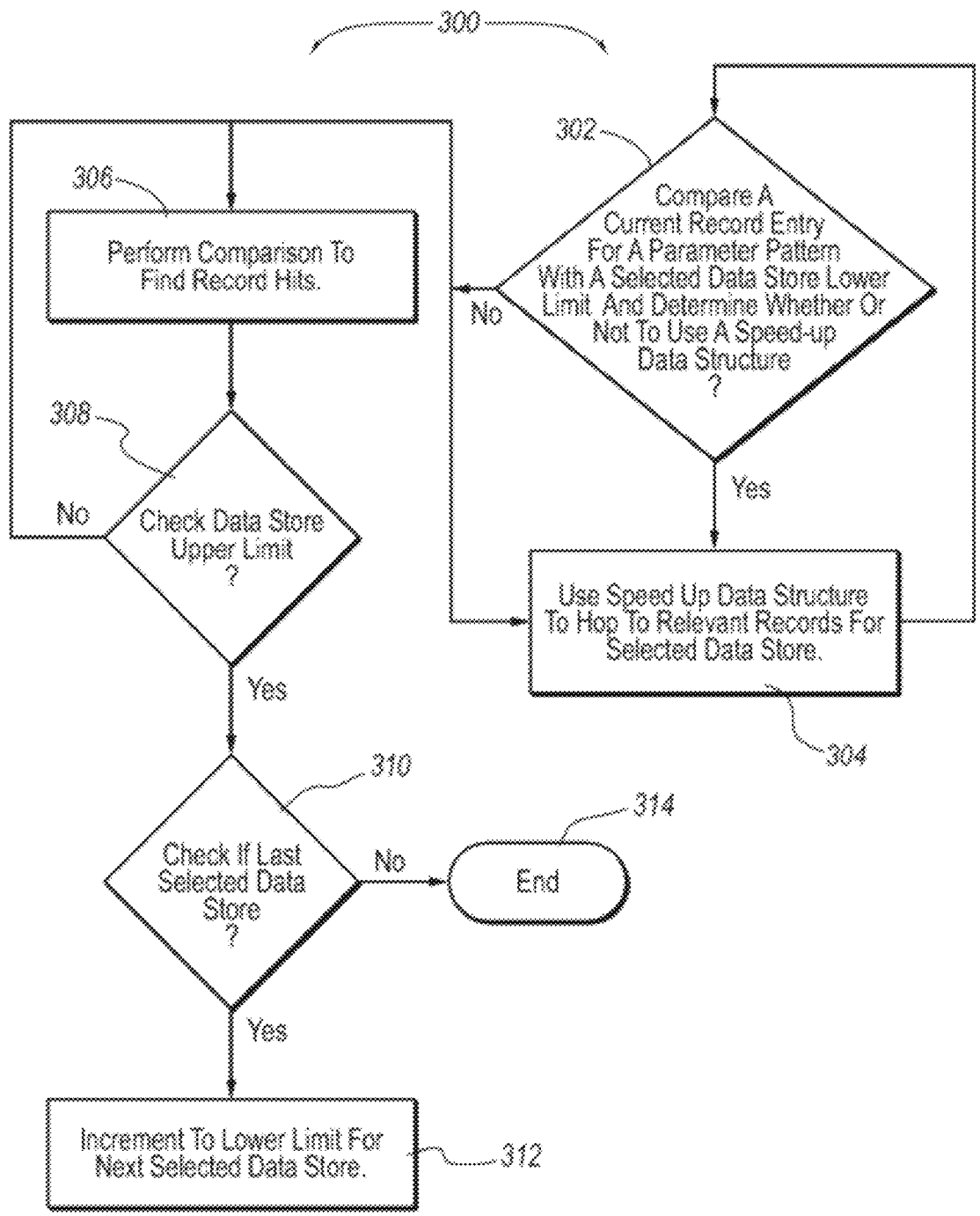
FIG. 3 illustrates a number of method steps that may be implemented to traverse an index for a composite data store.

Referring now to FIG. 3, a method 300 is illustrated. The method 300 illustrates various acts that may be performed to accomplish using a speed-up data structure with a composite data store. FIG. 3 illustrates an act of comparing a current record entry with a data store lower limit and determine whether or not to use a speed-up data structure (act 302). For example, in the example illustrated above, this act may be performed where a current record entry being compared is record 1 of the composite data store 110. A data store lower limit may be the beginning address of a selected data store in the composite data store. For example, the beginning address or lower limit of data store B in the composite data store 110 is 4,000,000. As explained previously, the determination may be based on one or more of a number of factors such as the number of records between data store records entries being compared. For example the determination may be based on the difference between the current record and the data store lower limit for a selected data store.

If it is determined at act 302 that a speed up data structure should be used to eliminate one or more comparisons of record entries, then the method 300 illustrates an act of using a speed of data structure to jump to relevant records for a relevant data base (act 304). As described previously, this may be accomplished by comparing offsets in an offset column such as offset column 202 in the offset correlation table 200 has opposed to performing comparisons on individual data store record entries.

If it is determined not to use a speed-up data structure, or the speed-up data structure has been used to skip a number of comparisons, the method 300 illustrates and act of performing comparisons to find record hits (act 306). Act 306 may include performing comparisons on entries in the data store records column 204. For example, comparisons may be performed beginning at 4,000,001.

FIG. 3 further illustrates an act of checking a data store upper limit (act 308). The present selected data store at this point in this example is data store B, which has an upper limit of 4,999,999. As 4,000,001 is not beyond the upper limit, processing continues back at act 306 to perform the next comparison at 4,000,003.

Processing continues in this fashion until the upper limit is reached or passed where after processing proceeds to a check to determine if this data store is the last selected data store (act 310). Because at the present point of processing in this example, data store B is being compared, and data store D has also been selected, the present data store is not the last selected data store. Thus, processing continues to an act of incrementing a data store reference to the lower limit for the next selected data store (act 312). In particular, the data store reference is incremented to 11,000,000, which is the record address in the composite data store 110 for the lower limit of the data store D. Processing continues as described above for data store B beginning at act 302.

Once processing of record entries for data store D has completed to act 310, a check is made at 310 to determine if this is the last selected data store. In this case, data store D is the last selected data store, and as such processing ends at act 314. Notably, at this point, record addresses may be returned or further processes as appropriate. It should be noted that in other embodiments, record addresses may be returned or processed when they are found.

It should be noted, that the use of index filtering described above using speed-up data structures may be used in conjunction with the techniques described in U.S. patent application Ser. No. 11/847,688 titled "Vortex Searching," filed on Aug. 30, 2007, previously incorporated herein by reference in its entirety or with other intersection techniques for intersecting parameter patterns.

For example, an index entry for a first parameter pattern may be compared to an index entry for a second parameter pattern. A determination can be made about whether or not to use a speed-up data structure based on the comparison as described in "Vortex Searching." Additionally, if it is determined that a jump should not be made based on the comparison of the index entries, or just prior to performing the jump, or to facilitate making the decision about whether or not to perform a jump, a comparison can be made to one or both of the index entries and a lower limit of a selected index. A determination to use a speed-up data structure jump can be based on this comparison.

For example, assume that an index entry for a first parameter pattern includes a reference to address 1,000 and that an index entry for a second parameter pattern includes a reference to address 2,000. Further, assume that an index of interest in a composite index for a composite data store has a beginning data store address being at address 10,000 of the composite data store. When determining whether or not to make a jump using a speed-up data structure, a programmatically implemented routine may be executed that compares distances between high and low index addresses. The routine would load 1,000 as the low address and 2,000 as the high address. The routine could then look at a lower boundary address, i.e. a beginning data store address, of a next selected index range to determine if the lower boundary address of the next selected index range should be substituted for the high address. In this case, because the lower address of the next selected index range (i.e. 10,000) is greater than the high address (i.e. 2,000), the lower boundary address of the next selected index range is entered as the new high address. As such, the determination about whether or not to use the speed-up data structure is based on the comparison of addresses 1,000 and 10,000 as opposed to 1,000 and 2,000. Additionally, the jump using the speed-up data structure is to entries at or above 10,000.

Once the jump has been performed, processing may continue whereby addresses in a first index entry for a first parameter pattern are compared to addresses in a second index entry for a second parameter pattern. When the addresses match, an indication can be provided that an intersection of parameter patterns has been located.

Additionally, comparisons should be made to determine when a selected data store upper limit has been reached or exceeded. This can be done as illustrated and described above for act 308 in FIG. 3. Further, as illustrated in act 310 of FIG. 3, checks may be performed to determine if all selected data stores have been searched.

Embodiments herein may be further enhanced by using an abbreviated index, such as the abbreviated index described in U.S. patent application Ser. No. 11/681,673, titled "Abbreviated Index" and filed on Mar. 2, 2007, which is incorporated herein by reference in its entirety. As described in that application, the use of randomization and/or spreading techniques used for index entries, as well as the searching by elision, or recognizing when there is an absence of a parameter pattern in a data store to forgo further data store processing, also contribute to efficiencies. Further, templates including combinations of parameter patterns may be indexed in the abbreviated index such that entire templates may be eliminated from searching. In the application described above, parameter patterns are represented by hashes. Thus, as used herein, a parameter pattern may include any representation of the parameter pattern, including the parameter pattern directly, a hash of the parameter pattern, or other representation of the parameter pattern.

Embodiments of the present invention may comprise or utilize a special purpose or general-purpose computer including computer hardware. For example, the embodiments described previously may be implemented using computing system comprising appropriate hardware and/or software including processors, memory, storage, operating systems, application software or other hardware or software. Additionally components may be implemented on each their own separate stand-alone computer system including individualized hardware where the machines are interconnected through network communication channels or other communication channels. Alternatively, components may be implemented on a common shared computer system, where the machines share resources, such as processor resources, memory resources, storage resources, or other resources.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a plurality of data stores, a method, performed by one or more processors, of finding records in one or more of the data stores based on user specified search patterns and based on selected data stores, the method comprising:
   combining a plurality of data stores into a composite data store, by renumbering addresses in one or more of the data stores such that the composite data store stores the data stores sequentially, such that each data store in the composite data store is in a range comprising a beginning composite data store address and an ending composite data store address;
   storing composite data store addresses corresponding to the renumbered beginning of each data store such that locations of each data store in the composite data store is identified by reference to the beginning composite data store address that corresponds to a beginning of a data store included in the composite data store;
   indexing data items in the composite data store to identify occurrences of the data items in records of the composite data store;
   referencing a first index entry for a user specified first data item, the first index entry including references to record addresses for records in the composite data store which include the first data item, further comprising referencing a first record address in the first index entry;
   selecting a first data store from among the plurality of data stores in the composite data store to search for the user specified first data item;
   referencing a first beginning composite data store address of the first selected data store wherein the first selected data store is selected from the plurality of data stores;
   determining that the first beginning composite data store address is above a predetermined threshold above the first record address; and based on determining that the first beginning composite data store address is above the predetermined threshold above the first record address, using a speed-up data structure to eliminate one or more comparisons of record entries in the first index entry between the first record address and the first beginning composite data store address.

2. The method of claim 1, wherein the composite data store is stored on a mobile device.

3. The method of claim 1, wherein the composite data store comprise one or more of an email data store, a contacts data store, a calendar data store or a tasks data store.

4. The method of claim 1, further comprising:
   referencing the first index entry, including referencing a second record address after the first beginning composite data store address;
   referencing a second index entry for a second user specified second data item, including referencing a third record address in the second index entry;
   determining that the second record address and the third record address are the same address; and
   based on determining that the second record address and the third record address are the same address, providing an indication that a hit has been found at the second record address.

5. The method of claim 1, further comprising:
   referencing the first index entry, including referencing a second record address after the first beginning composite data store address;
   referencing a first ending composite data store address of the first selected data store;
   determining that the second record address exceeds the first ending composite data store address; and
   in response to determining that the second record address exceeds the first ending composite data store address:
      referencing a second beginning composite data store address of a second selected data store;
      determining that the second beginning composite data store address is at an address that exceeds a predetermined threshold above the second record address; and
      based on determining that the second beginning composite data store address is at an address that exceeds a predetermined threshold above the second record address, using a speed-up data structure to eliminate one or more comparisons of record entries in the first index entry between the second record address and the second beginning composite data store address.

6. The method of claim 1, wherein the speed-up data structure comprises an offset correlation table.

7. The method of claim 1, wherein the speed-up data structure comprises a level bit shifting data structure.

8. The method of claim 7, wherein the level bit shifting data structure uses a five bit shift to shift between levels.

9. The method of claim 1, further comprising:
referencing the first index entry, including referencing a second record address after the first beginning composite data store address;
referencing a first ending composite data store address of the first selected data store;
determining that the second record address is at or exceeds the first ending composite data store address; and
in response to determining that the second record address is at or exceeds the first ending composite data store address:
determining that the first selected data store is the last data store selected for searching; and
providing an indication that the first selected data store is the last data store selected for searching.

10. The method of claim 9, wherein providing an indication that the that first selected data store is the last data store selected for searching comprises returning search results from one or more selected data stores.

11. The method of claim 1, further comprising:
determining a selection of results to be displayed to a user;
performing index comparisons until the selection of results is obtained; and
suspending index comparisons until user input is received indicating that more results should be displayed.

12. In a computing environment comprising a plurality of data stores, a method, performed by one or more processors, of finding records in one or more of the data stores based on user specified search patterns and based on selected data stores, the method comprising:
combining a plurality of data stores into a composite data store, by renumbering addresses in one of more of the data stores such that the composite data store stores the data stores sequentially, such that each data store in the composite data store is in a range comprising a beginning composite data store address and an ending composite data store address;
storing composite data store addresses corresponding to the renumbered beginning of each data store such that locations of each data store in the composite data store is identified by reference to the beginning composite data store address that corresponds to a beginning of a data store included in the composite data store;
indexing data items in the composite data store to identify occurrences of the data items in records of the composite data store;
referencing a first index entry for a user specified first, the first index entry including references to record addresses for records in the composite data store which include the first data item, further comprising referencing a first record address in the first index entry;
referencing a second index entry for a user specified second data item, the second index entry including references to record addresses for records in the composite data store which include the second data item, further comprising referencing a second record address in the second index entry;
selecting a first data store from among the plurality of data stores in the composite data store to search for the user specified first data item;
referencing a first beginning composite data store address of the first selected data store, the first selected data store being a data store from among the plurality of data stores in the composite data store;
determining that the first beginning composite data store address is above a predetermined threshold above at least one of the first record address or the second record address; and
based on determining that the first beginning composite data store address is above the predetermined threshold above at least one of the first record address or the second record address, using a speed-up data structure to eliminate one or more comparisons of record entries in the first index entry between at least one of the first record address and the second record address and the first beginning composite data store address.

13. The method of claim 12, wherein determining that the first beginning composite data store address is at or above a predetermined threshold above at least one of the first record address or the second record address comprises:
assigning the first record address as a low address;
assigning the second record address as a high address;
determining that the first beginning composite data store address is greater than the second record address;
as a result of determining that the first beginning composite data store address is greater than the second record address, assigning the first beginning composite data store address as the high address; and
comparing the high address to the low address to determine if the high address is above the low address by at least the predetermined threshold.

14. The method of claim 12, wherein the speed-up data structure comprises an offset correlation table.

15. The method of claim 12, wherein the speed-up data structure comprises a level bit shifting data structure.

16. The method of claim 15, wherein the level bit shifting data structure uses a five bit shift to shift between levels.

17. The method of claim 12, wherein the composite data store is stored on a mobile device.

18. The method of claim 12, wherein the composite data store comprise one or more of an email data store, a contacts data store, a calendar data store or a tasks data store.

19. A computing system comprising:
one or more processors;
one or more physical storage media coupled to the one or more processors, wherein the one or more physical storage media comprise computer executable instruction that when executed by the one or more processors cause the one or more processors to perform the following:
combining a plurality of data stores into a composite data store, by renumbering addresses in one of more of the data stores such that the composite data store stores the data stores sequentially, such that each data store in the composite data store is in a range comprising a beginning composite data store address and an ending composite data store address;
storing composite data store addresses corresponding to the renumbered beginning of each data store such that locations of each data store in the composite data store is identified by reference to the beginning composite data store address that corresponds to a beginning of a data store included in the composite data store;

indexing data items in the composite data store to identify occurrences of the data items in records of the composite data store;

reference a first index entry for a user specified first data item, the first index entry including references to record addresses for records in the composite data store which include the first data item, further comprising referencing a first record address in the first index entry;

selecting a first data store from among the plurality of data stores in the composite data store to search for the user specified first data item;

reference a first beginning composite data store address of a first selected data store wherein the first selected data store is selected from the plurality of data stores;

determine that the first beginning composite data store address is at or above an address at or above a predetermined threshold above the first record address; and based on determining that the first beginning composite data store address is at or above the predetermined threshold above the first record address, using a speed-up data structure to eliminate one or more comparisons of record entries in the first index entry between the first record address and the first beginning composite data store address.

20. The computing system of claim 19, wherein the speed-up data structure comprises a level bit shifting data structure and wherein the level bit shifting data structure uses a five bit shift to shift between levels.

* * * * *